US011240127B1

(12) United States Patent
Hevenor et al.

(10) Patent No.: US 11,240,127 B1
(45) Date of Patent: Feb. 1, 2022

(54) INDICATOR TOOLS

(71) Applicant: Pivotal Software, Inc., San Francisco, CA (US)

(72) Inventors: Adam Hevenor, Denver, CO (US); Amber Lynn Alston, Lakewood, CO (US); David Timm, Denver, CO (US); Dennis Collinson, Denver, CO (US); Joseph Rodriguez, Denver, CO (US); Vera Reynolds, Denver, CO (US); Andrew Poydence, Erie, CO (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/290,405

(22) Filed: Mar. 1, 2019

(51) Int. Cl.
*H04L 12/26* (2006.01)
*H04L 12/24* (2006.01)
*H04L 29/08* (2006.01)

(52) U.S. Cl.
CPC ........ *H04L 43/045* (2013.01); *H04L 41/5009* (2013.01); *H04L 43/16* (2013.01); *H04L 67/10* (2013.01)

(58) Field of Classification Search
CPC ..... H04L 67/10; H04L 41/5009; H04L 67/34; H04L 67/02; H04L 63/06; H04L 9/3247; H04L 41/22; H04L 41/5019; H04L 43/50; H04L 63/08; H04L 63/0823; H04L 63/12; H04L 63/20; H04L 65/4069; H04L 65/80; H04L 67/1097; H04L 67/12; H04L 67/303; H04L 67/306; H04L 9/0866; H04L 9/14; H04L 2209/127; H04L 41/046; H04L 41/0806; H04L 41/082; H04L 41/0893;
(Continued)

(56) References Cited

U.S. PATENT DOCUMENTS

2014/0325514 A1* 10/2014 Benedetti ................. G06F 8/65
 718/1
2016/0306876 A1* 10/2016 Nichols ................. G06F 16/345
(Continued)

OTHER PUBLICATIONS

Dam, "Everything You Need to Know About Monitoring Mixins," GrafanaLabs, dated Sep. 13, 2018, 6 pages.
GitHub.com [online] "cloudfoundry/loggregator-release," dated Jan. 29, 2019, [retrieved on Mar. 6, 2019] retrieved from https://github.com/cloudfoundry/loggregator-release/blob/develop/jobs/doppler/templates/indicators.yml.erb, 2 pages.
(Continued)

*Primary Examiner* — Djenane M Bayard
(74) *Attorney, Agent, or Firm* — Fish & Richardson P.C.

(57) ABSTRACT

Methods, systems, and apparatus, including computer programs encoded on computer storage media, for generating user interfaces and alerts for applications running on software platforms using indicator files. A method includes obtaining, by a software platform system configured to host computing tasks in a cloud computing environment of the distributed computing system, a user-customizable indicator file that specifies a set of indicators and, for at least one of the indicators, one or more alert thresholds. Each indicator is a measurable parameter for a particular computing task hosted by the software platform system. A monitoring service uses the user-customizable indicator file to obtain one or more values for each of one or more of the indicators from the software platform system. The monitoring service uses the user-customizable indicator file to generate a graphical user interface that includes, for each indicator, data specifying the one or more values for the indicator.

18 Claims, 4 Drawing Sheets

(58) Field of Classification Search
CPC ............. H04L 41/5003; H04L 41/5032; H04L 41/5041; H04L 41/5067; H04L 43/08; H04L 47/70; H04L 51/32; H04L 63/062; H04L 63/083; H04L 63/1433; H04L 65/102; H04L 65/403; H04L 67/1031; H04L 12/2807; H04L 41/20; H04L 41/26; H04L 43/0811; H04L 41/0233; H04L 41/0853; H04L 12/66; H04L 43/00; H04L 43/0882; H04L 43/16; H04L 47/10; H04L 63/1408; H04L 67/104; H04L 67/22; H04L 67/26; H04L 43/045; H04L 43/0817; H04L 63/10; H04L 67/1034; H04L 67/148; H04L 9/0861; H04L 9/0897; H04L 9/302; H04L 9/3066; H04L 9/3234; H04L 9/3249; H04L 9/3252; H04L 9/3268; H04L 12/1407; H04L 12/4633; H04L 1/0002; H04L 2209/38; H04L 2209/56; H04L 2463/082; H04L 29/08; H04L 29/0827; H04L 41/0213; H04L 41/0246; H04L 41/0253; H04L 41/0273; H04L 41/06; H04L 41/0803; H04L 41/0809; H04L 41/0813; H04L 41/0816; H04L 41/0896; G06F 11/3668; G06F 11/3688; G06F 11/3006; G06F 16/13; G06F 16/211; G06F 21/566; G06F 21/56; G06F 11/00; G06F 21/552; G06F 21/554; G06F 21/568; G06F 9/545; G06F 40/103; G06F 11/1438; G06F 11/1441; G06F 16/00; G06F 21/575; G06F 9/0408; G06F 9/4418

See application file for complete search history.

(56) References Cited

U.S. PATENT DOCUMENTS

| | | | | |
|---|---|---|---|---|
| 2016/0371122 | A1* | 12/2016 | Nair | G06F 9/5005 |
| 2018/0025021 | A1* | 1/2018 | Jain | H04L 67/1095 |
| | | | | 707/626 |
| 2018/0131579 | A1* | 5/2018 | Jacobs | H04L 41/082 |
| 2018/0324059 | A1* | 11/2018 | Johal | H04L 41/5009 |
| 2019/0370228 | A1* | 12/2019 | Danziger | G06F 16/183 |
| 2019/0394283 | A1* | 12/2019 | Morrison | G06F 7/50 |

OTHER PUBLICATIONS

GitHub.com [online] "Pivotal Indicator Protocol: Configuration and Patches," Jan. 2019, [retrieved on Feb. 22, 2019], retrieved from: https://github.com/pivotal/indicator-protocol/wiki/Configuration-and-Patches, 3 pages.

GitHub.com [online] "Pivotal Indicator Protocol: Developing Locally," Jan. 2019, [retrieved on Feb. 22, 2019], retrieved from: https://github.com/pivotal/indicator-protocol, 3 pages.

GitHub.com [online] "Pivotal Indicator Protocol: Getting Started," Jan. 2019, [retrieved on Feb. 22, 2019], retrieved from: https://github.com/pivotal/indicator-protocol/wiki, 5 pages.

GitHub.com [online] "Pivotal-cf/cf-rabbitmq-release," Jan. 28, 2019, [retrieved on Mar. 6, 2019], retrieved from: https://github.com/pivotal-cf/cf-rabbitmq-release/blob/master/jobs/rabbitmq-server/templates/indicators.yml.erb, 4 pages.

jsonnet.org [online], "A Data Templating Language for App and Tool Developers," year 2018, [retrieved on Feb. 22, 2019], retrieved from: https://jsonnet.org/, 4 pages.

Pivotal Software Inc., "Pivotal Cloud Foundry Documentation: Key Performance Indicators," Pivotal Product Documentation, Version 2.4, Dated Dec. 19, 2018, 28 pages.

\* cited by examiner

INDICATOR TOOLS

BACKGROUND

This specification relates to cloud computing platforms, and more particularly to indicator tools for generating user interfaces and alerts for applications running on software platform systems.

A cloud application platform is platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be provided by a different entity, e.g., an entity providing an infrastructure-as-a-service ("IaaS") platform. The cloud application platform can handle provisioning of resources in the underlying cloud computing infrastructure as well as staging and launching of applications using the provisioned resources. Therefore, developers who use the cloud application platform need not spend time building or configuring the hardware of a cloud computing system. Rather, the developers can focus on the application development itself, and rely on the services provided by the cloud application platform to launch and manage instances of the application. After being launched, the application instances can be used by end users over a network, e.g., the Internet.

Some cloud application platforms provide integrated services. A service is a software subsystem that can provide one or more functionalities for use by platform applications. An example of a service for use by a platform application is a database management system that maintains a database that can be accessed and modified by platform applications.

To provide a service, a cloud application platform can launch one or more service instances, which are software modules that implement the functionality of the service. A cloud application platform can automatically provision resources for executing service instances. This collection of resources may be referred to as a services back-end, which can either be pre-provisioned or provisioned on demand.

The services can monitor and compute various parameters, such as performance metrics, related to the execution of the application. A data logging tool can receive these parameters from the services and store the data for retrieval. A dashboarding tool can generate user interfaces, e.g., dashboards, that present the parameters.

To obtain such data for the user interfaces, the dashboarding tool can query the stored data using labels for the parameters. For example, a platform operator can configure the user interfaces by assigning labels to various graphs of the user interface. However, this can be laborious for operators to configure the user interfaces, especially if an application uses multiple services that each have their own metrics. In addition, it is possible for parameters to be removed, renamed, or otherwise changed as the platform and its services evolve. Any of these changes can jeopardize an operator's carefully constructed dashboards. For example, an update to a service can include different labels for metrics, new metrics, and/or may not support previous metrics of the previous version of the service. In this example, the operator would have to reconfigure the user interfaces after the update.

SUMMARY

This specification describes indicator tools including indicator files and indicator protocols that define indicators for user interfaces, e.g., dashboards, and alarm thresholds for generating notifications to operators of a cloud computing platform. The same indicator files and protocols can be platform-independent such that the indicator files and protocols used to generate user interfaces that present metrics for a software application can be used by different software platforms that execute different types of software tasks. Different monitoring tools, alerting tools, and documentation tools can also use the indicator files to generate user interfaces, alerts, and other documents based on the indicators defined in the indicator files. Each application, service, or component of a software platform can have an associated indicator file that defines the indicators for that application, service, or component. The indicator files can be modified by platform operators, application developers, service developers, or other users, e.g., to reconfigure the threshold for an alert or define different indicators for which to generate a graph or other user interface element.

Particular embodiments of the subject matter described in this specification can be implemented to realize one or more of the following advantages. A single platform-independent indicator file can be used by different software platforms for the generation of user interfaces, e.g., dashboards, that present metrics for computing tasks being executed on the platforms and to generate notifications when thresholds for the metrics are satisfied. This enables a cloud system to generate the user interfaces and notifications automatically without requiring user configurations that may be complex and erroneous. Using an indicator file to define the indicators that are monitored by the application ensures that monitoring services that generate the user interfaces and alerts query the correct parameters that are monitored by the application, which reduces user interface errors caused by queries for incorrect labels.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
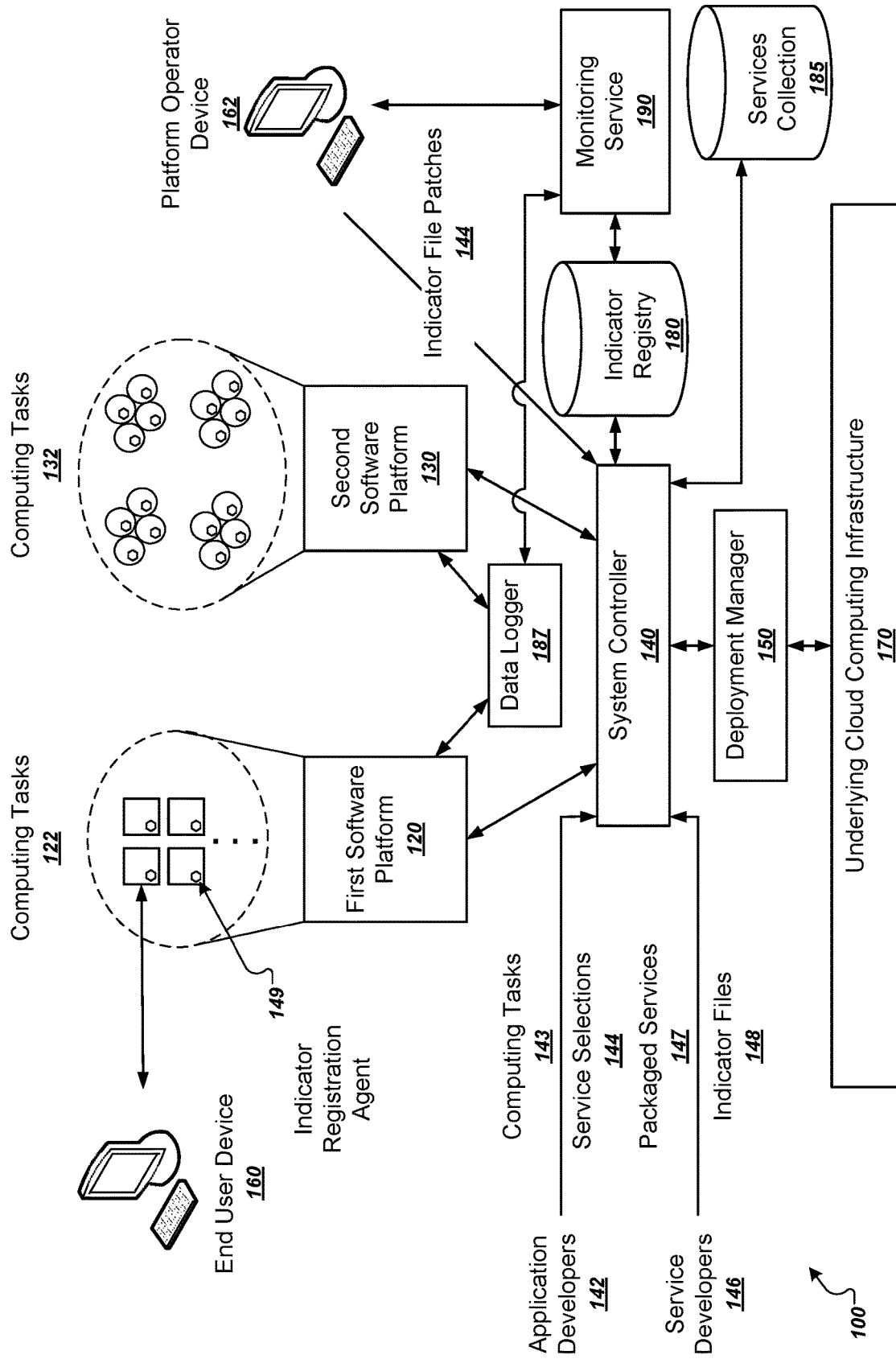
FIG. 1 illustrates a cloud system that includes multiple software platforms.

This specification describes technologies for generating user interfaces and alerts for indicators using a user-configurable and platform-independent indicator file. The indicator file can specify indicators that are monitored for computing tasks running on a software platform. The indicators are measurable parameters, e.g., performance metrics, related to the execution of the computing tasks and/or services consumed by the computing tasks. For example, the indicators can be service level indicators related to the performance of a service being consumed by the application. The indicator file can include, for each indicator, data that defines a query into a data structure, e.g., a data model or database, that stores the values of the indicators. The indicator file can also specify thresholds, e.g., alarm thresholds, for the indicators and/or documentation for the indicator. The documentation can include text that describes the indicator, the alarm threshold(s) for the indicator, recommended responses to the alarm threshold(s) being satisfied, and/or other appropriate text that can be sent with the notification and/or displayed in the user interface.

A monitoring service can use the indicator file to generate user interfaces and/or alerts based on the values of the indicators. For example, the monitoring service can generate a dashboard user interface that includes a visualization, e.g., a graph, for each indicator defined in the indicator file. The monitoring service can also use the indicator file to generate queries into the data structure to obtain the values for the parameters for use in populating the user interfaces and generating notifications. For example, when the value of an indicator satisfies the threshold for the indicator, the monitoring service can generate and transmit a notification to a user, e.g., to a platform operator, to notify the user of the condition defined by the alarm threshold.

A software developer that develops a software application, e.g., a service consumed by computing tasks, an application that packages the computing task, or a component of a cloud system, e.g., a software application platform or a deployment manager, can provide the indicator file for the application. In this way, the software developer can generate indicator files that define the indicators monitored by the software application. The software developer can also define, in the indicator file, default alarm thresholds. The indicator files can be user-configurable such that operators can define which indicators should be included in the user interface and can define the alarm thresholds based on their operating environment and required performance.

The indicator file can also be platform-independent such that the same indicator file can be used by different software platforms. For example, the same indicator file for a software application can be used by different software platforms to generate user interfaces for presenting values of the indicators as the application is executed in the platforms and to generate notifications based on the alarm thresholds defined in the indicator file.

FIG. 1 illustrates a cloud system 100 that includes multiple software platforms. In particular, the cloud system 100 includes a first software platform 120 and a second software platform 130. One example implementation having multiple software platforms is a cloud system 100 that uses a cloud application platform with a container orchestration platform. An example of a container orchestration platform is Pivotal Container Service, which provides the functionality for launching Kubernetes clusters to run container workloads.

A cloud application platform is typically an environment designed for high-productivity software development. Therefore, much of the underlying configurations and dependencies are handled automatically, e.g., using frameworks and other integrated development tools, during staging and launching of the applications.

On the other hand, container orchestration platforms are better for hosting third-party, off-the-shelf software that may not have been written with development environment of the cloud application platform in mind. Thus, it is possible to adapt third-party, off-the-shelf software for use on a cloud application platform, doing so would typically require much more work and configuration that simply launching the software in one or more container workloads of a container cluster running an already compatible operating system.

The cloud system 100 includes a system controller 140. A system controller 140 is a software system that coordinates the setup and management of the software platforms 120 and 130. To do so, the system controller 140 makes use of a deployment manager 150 that can provision appropriate resources in an underlying cloud computing infrastructure 170. For example, the deployment manager 150 can be implemented using the open source BOSH project.

The cloud system 100 can be set up and configured by operators of an entity that maintains the system 100. These can include platform operators that maintain the first software platform 120 and platform operators that maintain the second software platform 130. Although the cloud system 100 is illustrated as having both a first software platform 120 and a second software platform 130, the techniques described herein can be used with cloud systems having a single software platform or more than two software platforms.

An application developer 142 can provide a packaged computing task 143 to the system controller 140 for execution by one of the software platforms 120 and 130. The system controller 140 can then use the deployment manager 150 to provision resources for hosting multiple instances 122 or 132 of the computing task 143 in the software platform 120 or 130.

The application developer 142 can also bind services to the computing task 143. For example, the cloud system 110 can receive and store packaged services 147 from service developers 146. A service in execution is a software subsystem that includes one or more service instances. Thus, each packaged service 147 can include at least source code, executable files, or both, and any required dependencies, for launching service instances that implement the service. An example of a service is a database management system that maintains a database that can be accessed and modified by the computing task 143. For example, the computing task 143 can be a web application created by the application developer 142 that implements a web site that provides a message board for a community of online users. The message posts of the community can be maintained by a database managed by a database management system that is produced by a service developer 146 and that is implemented as a third-party service. By binding database management system service to the web application, the instances of the web application can communicate with the database management system when serving traffic from end user devices, e.g., an end user associated with end user device 160.

The cloud system 100 can store packaged services 147 received from the service developers 140, e.g., in a services collection 185. The system controller 140 can read the services collection 185 to obtain a list of all available services for use by computing tasks hosted by the software platforms 120 and 130. The system controller 140 can then provide a marketplace user interface that allows application developers 142 to select services to bind with their computing tasks 143. The system controller 140 can receive data specifying selected services 144 from the marketplace user interface.

Upon receiving a selection of one or more services by an application developer 142, the system controller 140 uses the deployment manager 150 to provision resources in the underlying cloud computing infrastructure 170 to host the service instances to implement the selected services in one of the software platforms 120, 130, or another appropriate platform.

The service providers 146 can also provide indicator files 148, e.g., with their packaged services 147. The indicator files 148 can be in the form of documents, e.g., YAML files. As described above, an indicator file 148 can specify indicators that are monitored for computing tasks running on a software platform, alert thresholds for the indicators, data that defines a query for the indicator, and/or documentation for the indicators. For example, the service instances can monitor performance metrics related to the service that is being provided for the computing task 143. In a particular example, a database management service can monitor traffic metrics, the number of requests per service instance, response times. Each of these metrics can be defined in the indicator file 148 for the database management service.

Although the examples that follow are described largely in terms of indicator files for services, indicator files can also be used to query data from computing tasks, components of the cloud system 100, e.g., the deployment manager 150, the software platforms 120 and 130, and/or components thereof, and other software running in the software platforms 120 and 130, and to generate user interfaces and notifications for the software. For example, a software developer that develops the deployment manager 150 can provide and update an indicator file for the deployment manager 150. Similarly, a software developer that develops the software platform 120 or 130 can provide an indicator file for the software platform 120 or 130.

The use of indicator files 148 provided by the software developers, such as the service developers 146, enables platform operators to have an easy out-of-the-box solution for full-scale observability. The software developers can define, in the indicator file 148, the service level indicators for their software, as well as the relevant alerting thresholds, if any.

In some implementations, the deployment manager 150 deploys an indicator registration agent 149 in each virtual machine or container that is deployed in the software platforms 120 and 130. The indicator registration agent 149 can search a file system of the cloud system to find indicator files 148 for the computing task or service that is deployed in the virtual machine or container. For example, the indicator registration agent 149 can automatically search for an indicator file for the computing task or service when the computing task or container is initiated.

The indicator registration agent 149 can determine whether an indicator file 148 is for the computing task or service based on an identifier and version for the computing task or service. For example, each indicator file 148 can include the identifier and the version. The indicator registration agent 149 can compare the identifier for the computing task or service of the corresponding virtual machine or container to the identifier and version specified in the indicator file to determine whether they match. In other implementations, the deployment manager 150 can search for indicator files 148 or provide files to the indicator registration agents 149 when the computing tasks and services are initiated.

If the indicator registration agent 149 finds an indicator file 148 for the computing task or service, the indicator registration agent 149 can register the indicator file 148 for the computing task or service in an indicator registry 180. The indicator registry 180 can include, along with the indicator files, a list of active indicator files in the software platforms 120 and 130. For each indicator file 148 in the list, the indicator registry 180 can also store data identifying the service instance (or computing task) that registered the indicator file 148. In this way, the indicators generated for each instance can be queries and used to generate user interfaces and notifications.

A monitoring service 190 can access the indicator files 148 in the indicator registry 180. The monitoring service 190 can use the indicator files 148 to query the values of parameters from a data logger 187. For example, the data logger 187 can obtain the values of indicators generated by each computing task and service running in the software platforms 120 and 130. The data logger 187 can store the data as key-value pairs. The key can be a label for the indicator and the value can be the value of the indicator. The data logger 187 can also store, for each value of each indicator, timestamp information that identifies a time at which the value of the indicator was determined or received by the data logger 187. An example of a data logger 187 for software platforms is the open source Prometheus monitoring and alerting toolkit.

To obtain the value of an indicator, the monitoring service 190 can obtain a query expression for the indicator from the indicator file 148. The query expression can include data specifying an identifier of the indicator that matches the key for the indicator stored by the data logger 187. The query expression can also include fields populated by the monitoring service 190 for the particular instance for which the value of the indicator is being obtained. The monitoring service 190 can populate these fields and submit the query to the data logger 187.

The monitoring service 190 can also generate user interfaces and notifications using the indicator files 148. For example, the monitoring service 190 can identify each indicator specified by an indicator file for a particular instance and automatically generate a dashboard user interface that includes one or more values for each indicator, without any additional input from a user. That is, the user may not have to configure any graph or other visualization of the user interface. Instead, all of the data required for configuring the user interface can be included in the indicator file 148.

Using indicator files 148 that are decoupled from the user interfaces enables service developers 146 to provide automatic failover of monitoring services 190 during an upgrade of the service 147. For example, when the service is upgraded, the indicator registration agent 149 can find the indicator file for the upgraded version of the service and register the indicator file with the indicator registry 180 automatically, e.g., without any additional input from a user. If the queries for the metrics are coupled with the user interfaces, users would have to perform a manual failover to configure the monitoring service 190 to obtain the metrics from the upgraded version of the service.

The one or more values can be presented in a graph, table, or other visualization, e.g., as defined in the indicator file 148 as described below. The monitoring service 190 can obtain the one or more values for each indicator by querying the data logger 187, as described above. The monitoring service 190 can provide the user interface to a platform operator device 162 for presentation to a platform operator.

In some implementations, the monitoring service 190 generates and provides, to the platform operator device 162, a user interface that includes a link for each instance of a computing task or service for which the indicator registry 180 includes an entry. For example, this user interface can be a main dashboard that is displayed when the platform operator opens a monitoring application of the monitoring service 190. If the platform operator selects a link, the monitoring service 190 can generate the user interface for that instance and provide the user interface to the platform operator device 162 for presentation to the operator.

The monitoring service 190 can also generate notifications based on the alarm thresholds for the indicators as specified in the indicator file 148. For example, the monitoring service 190 can extract each threshold and monitor the values of the indicators, e.g., by periodically querying the values, to determine whether a value of an indicator satisfies the threshold. A value of an indicator can satisfy a minimum threshold by being less than or equal to the minimum threshold. Similarly, a value of an indicator can satisfy a maximum threshold by being greater than or equal to the maximum threshold.

If the monitoring service 190 determines that the value of an indicator satisfies its threshold, the monitoring service 190 can generate and send a notification to the platform operator device 162 or another appropriate device, e.g., a mobile phone of a platform operator. The notification can indicate the instance for which the notification was generated, the indicator for which the threshold was satisfied, the value of the indicator, any text included in the documentation for the indicator, and/or other appropriate information. For example, the documentation can include a recommended response to the threshold being satisfied and/or information about how the threshold is set. This documentation can also be displayed on the user interface for the instance, e.g., when the value of the indicator satisfies the threshold.

As the appropriate thresholds and indicators that are monitored can vary based on the computing tasks, the implementation of the computing tasks on the software platforms, and other factors, the cloud system 100 can enable the platform operators or other users to modify the indicator files 148. For example, a requests per second critical threshold of 10,000 may be a good default for some service, but in a faster environment a single node may be able to handle 15,000 requests per second. It would not make sense to alert and scale up in this scenario of underutilization as it would waste infrastructure resources. To accommodate this, platform operators can patch the property of an indicator file as needed.

In some implementations, a repository, e.g., a git repository is maintained for these patches. The indicator registry 180 can be configured to access the repository to obtain the patches. For example, a platform operator or other user can configure a formatted patch document, e.g., a YAML patch document. The indicator registry 180 can be configured to access the path documents, e.g., periodically, and apply the patches to the indicator files 148.

A patch document can include various attributes that are used by the indicator registry 180 to modify an indicator file 148. For example, the patch document can include an apiVersion attribute that specifies the indicator protocol version used in the document. For example, the indicator protocol used in the indicator files can change over time. For each change, a new version of the indicator protocol can be generated.

The patch document can also include a product attribute that specifies the service and version of the service that corresponds to the indicator file 148 that is to be modified by the patch. The indicator registry 180 can use these attributes to identify the appropriate indicator file 148. Similarly, the patch document can include metadata that the indicator registry can match to metadata of the indicator file for use in identifying the correct indicator file 148.

The patch document can also include the operation of the patch, e.g., the operation to modify the indicator file 148. For example, the operation can be an add operation to add an indicator, a threshold for an indicator, documentation for an indicator, or a section subarea for an indicator so that the indicator is included in user interfaces, as described below. Similarly, the operations can be a remove operation to remove such data, a replace operation to replace such data with new data, a move operation to move the data within the indicator file, a copy operation to copy the data, or a test operation. For each operation, the patch document can include a path to the appropriate data, e.g., a title of the indicator, and the value to be added to the indicator file 148 or replaced in the indicator file 148 if the operation is a add operation or a replace operation.

The indicator files 148 can be specific to particular versions of a service. For example, each version of a service may have different indicators or the same indicators with different labels. If the indicator file for an older version of the service is used for a newer version of the service, or vice versa, the user interfaces generated using the indicator file may include graphs or other visualization with no data as the queries generated by the monitoring service 190 will not return any data from the data logger 187 if the label for an indicator is incorrect. Thus, the monitoring service 190 can use, for each instance of a service, the indicator file for the version of that instance of the service.

When the version of a service is updated, the service developer 146 can provide an updated indicator file 148 for the updated version of the service. The system controller 140 can overwrite the previous indicator file for the older version of the service with the updated indicator file 148, assuming no instances of the service have not been updated. If multiple versions of the service are running in the software platforms, the system controller 140 can keep the indicator file for each version in the indicator registry. 180.

The monitoring service 190 can use the same indicator files to generate user interfaces and notifications for each software platform 120 and 130. If a particular monitoring service does not support the query language used for the query expressions, the query expressions of the indicator file can be translated to a query language supported by the monitoring service.

Using the indicator files 148 enables various monitoring tools to generate user interfaces and notifications for services and computing tasks running in software platforms. For example, various third-party dashboarding tools and other monitoring services can be configured to parse the indicator files, generate user interfaces that initiate queries based on query expressions included in the indicator files 148, and generate notifications based on alarm thresholds included in the indicator files 148.

The cloud system 100 can also provide tools that enable platform operators to verify indicators of indicator files work appropriately. For example, a command provided to a CLI, e.g., an indicator-verification command, can cause the system controller 140 to test the indicators. The system controller 140 can take the indicator file 148 and configuration for connecting to the data logger 187 and use this to test the indicators. The system controller 140 can output both a report and a binary output that indicate whether the indicator file produced values for each indicator in the indicator file 148. This is useful to ensure that a software release has not broken queries by changing parameter labels.

Figure 2:
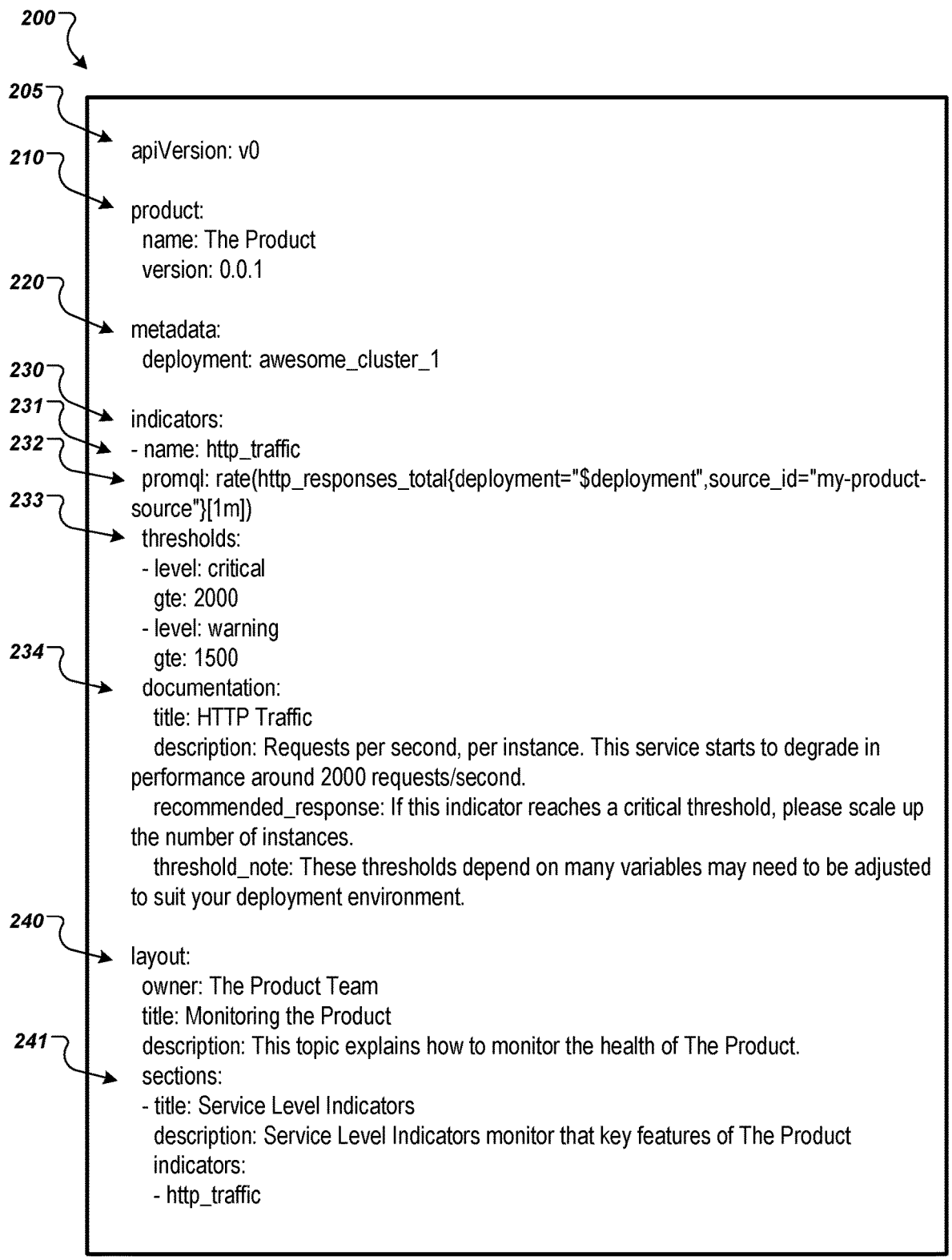
FIG. 2 illustrates an example indicator document.

FIG. 2 illustrates an example indicator document 200. The example indicator document 200 includes top-level attributes 205. The top-level attributes include an indicator protocol version used in the indicator document 200. For example, the indicator protocol used in the indicator documents can change over time. For each change, a new version of the indicator protocol can be generated.

The top-level attributes 205 also includes information about the product 210, e.g., the software application, that corresponds to the indicator document 200. For example, the information about the product can specify the packaged computing task or service and the version of the packed computing task or service corresponding to the indicator document 200. As described above, this information 210 can be used by the software platforms 120 and 130 to identify an indicator document for an instance of a computing task or service. This information 210 can also be used by a monitoring service 190 to name user interfaces, e.g., dashboards and determine icons and other visual elements of the user interfaces. The monitoring service 190 can use the version information to indicate to platform operators the version of the software for which they are viewing indicators or notifications. The indicator registry 180 can also use this information 210 to identify and upsert the indicator document 200.

The indicator document 200 also includes metadata 220. The metadata 220 can include a key-value map of mete information. The fields can be referenced by components that use the indicator document 200. Some common metadata keys include a deployment key for a name of a deployment of an instance of a computing task or service, a service broker identifier that identifies the service broker, and a parent service broker identifier that identifies the service broker that created service instance if the indicator document 200 is for a service. This service broker information enables the monitoring service 190 to nest broker/instance dashboards in the user interfaces.

The indicator document 200 also includes one or more indicators 230 and data that defines the indicators. The data for the indicator 230 includes a name 231 of the indicator 230, which can be referenced in a documentation block as described below. The data for the indicator 230 can also include a query expression 232 for producing a value of the indicator. For example, the query expression 232 can be used by a monitoring service 190 to query a data logger 187 for one or more values of the indicator 130. In this example, the query expression 232 is a Prometheus Query Language (PromQL) expression for obtaining values from a Prometheus data model. The query expression can be configured for other types of data loggers.

The example query expression 232 includes a function ("rate") that specifies a function that is to be performed on values of the indicator and a time period ("1 m") for the function. The query expression 232 also includes a label ("http:response_total") for the indicator that matches the key for the indicator stored by the data logger 187. The query expression 232 also includes a deployment field ("$deployment") and a source identifier field ("my-product-source") that can be populated by the monitoring service 190 to specify the particular deployment for which values of the indicator are being obtained.

The data for the indicator 230 also includes thresholds 233 for the indicator 230. In particular the indicator 230 has two thresholds, a critical threshold of 2000 and warning threshold of 1500. The monitoring service 190 can use the thresholds to generate and provide notifications to platform operators or other users. Each threshold includes a condition for satisfying the threshold. In this example, both thresholds have a greater than or equal to ("gte") condition. Thus, if the one-minute HTTP response rate for "awesome_cluster_1" is greater than or equal to 1500, the monitoring service 190 can generate a warning level notification.

In some implementations, the indicator document 200 can enable users to specify other attributes of thresholds. For example, the indicator document 200 can include attributes for specifying what information is provided in a notification, e.g., what portions of the documentation to include, and/or where to send the notifications, e.g., to what devices or users.

In some implementations, the indicator document 200 enables users to specify dynamic thresholds. For example, a web application may receive more traffic during different time periods throughout the day. In this example, a user can specify a respective threshold for each time period of the day.

The data for the indicator 230 also includes documentation 234 for the indicator 230. The documentation 234 can be included in notifications that are sent in response to thresholds being satisfied. The documentation 234 includes a title that is a human-readable title of the indicator 230, a description of the indicator 230, a recommended response to the indicator having a warning or critical level value, and a threshold note that will appear next to the thresholds in documentation. The threshold note can be used for guidance in determining the thresholds. By including the documentation in the notifications and/or in user interfaces when the threshold(s) are satisfied, the platform operator can view additional information about the reason for the notification and a recommended response for addressing the state of the instance.

The documentation 234 allows software developers to qualify their service level indicators. This allows the software developers to not only highlight the why behind each indicator, but to give platform operators an idea of how to address issues which may arise.

The indicator document 200 can also enable users to distinguish between indicators and service level indicators (SLIs) that are more important as they typically have a greater effect on end users. The indicator document 200 can also enable users to specify the desired uptime for SLIs and/or combine SLIs from various components into a meta-SLI for the combined experience. For example, a service developer 146 can specify, in the indicator document 200, which indicators are important, e.g., by including text, a flag, or other data that indicates that the indicator is important or that the indicator is an SLI.

A platform operator can view the indicators in the indicator document 200 and specify in the indicator document 200, for one or more important indicators (e.g., SLIs), a target percentage of time that the value of the important indicator should meet a threshold. A monitoring service can use this data in the indicator document 200 to monitor the percentage of time that the value of the indicator satisfies the threshold, e.g., over a running period of time. The monitoring service can also maintain, for the running period of time, an error budget that represents an amount of time that the indicator can fail to satisfy the threshold while still meeting the target percentage of time.

The monitoring service can use this data when determining when to send a notification. For example, if the value of the indicator fails to satisfy the threshold for a short period of time but the error budget has a large duration of time, e.g., greater than a threshold duration of time, the monitoring tool can delay sending a notification until the error budget is exhausted or within the threshold duration of time of being exhausted. In this way, if the service has performed well overall, a platform operator does not receive nuisance alarms for short degradations.

The indicator document 200 also includes a layout area 240 that defines the composition of dashboards, HTML documentation generated using, for example, an indicator-format command, and/or other user interfaces. A platform operator can modify this area to change the composition of the user interfaces. For example, the layout area 240 includes data specifying an owner of the indicator document 200 that can be displayed in the user interfaces, a title for the top level page header of the user interfaces, and a description that can appear, for example, under the table of contents.

The layout area 240 also define one or more sections of the user interfaces. For each section, the layout area 240 includes a sections subarea 241 that includes a title of the section, a description of the section, and the indicators to include in the section. For example, each section can correspond to a particular indicator and include the title for the indicator and a visualization, e.g., graph, table, or raw numbers, for the indicator. The monitoring service 190 can identify each sections subarea 241 in the indicator document 200 and generate a section of a user interface, e.g., a dashboard user interface, to present the data for each indicator corresponding to a sections subarea 241.

In some implementations, the layout area 240 can enable users to define more about the visualization for an indicator. For example, the layout area 240 can include attributes that enable users to specify a type of graph for the visualization, whether the visualization will include a table or raw numbers, or other appropriate features of a visualization.

A platform operator can modify the layout area 240 to specify the indicators that the platform operator wants to include in a user interface. Thus, the user interface for a service instance or computing task instance can be customized by modifying the indicator document 200 rather than having to configure a dashboard or other user interface directly.

In some implementations, a user can generate meta-indicators in the indicator document. A meta-indicator can be based on multiple indicators. For example, a meta-indicator can have a status, e.g., healthy or unhealthy, based on whether two or more indicators satisfy their thresholds.

Figure 3:
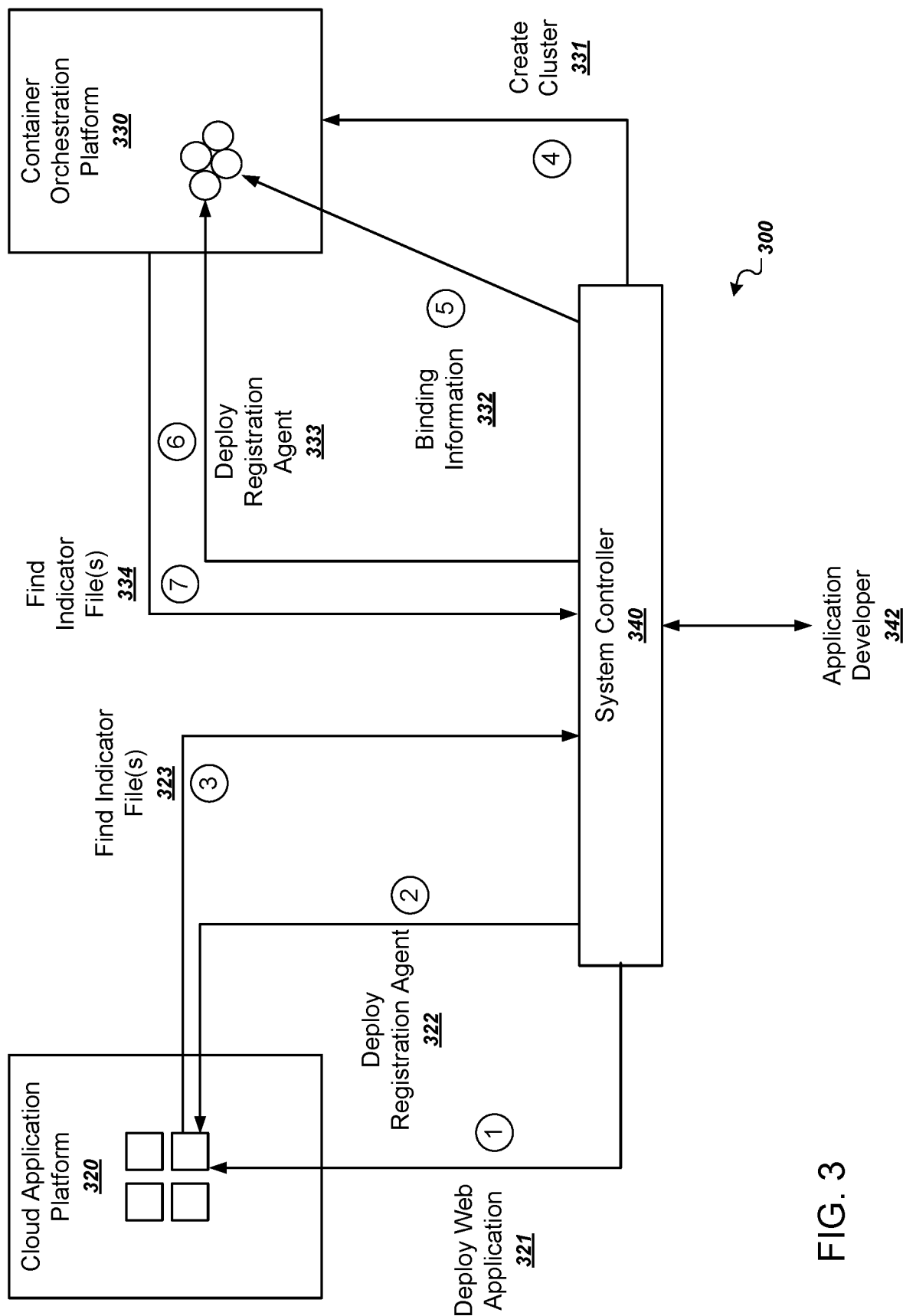
FIG. 3 is a diagram that illustrates the user commands and dataflow to deploy software tasks and register indicator files.

FIG. 3 is a diagram that illustrates the user commands and dataflow to deploy software tasks and register indicator files. FIG. 3 will be described in the context of an application developer 342 driving the process by issuing commands through a command-line interface that are received and interpreted by a system controller 340. The same techniques can also be used for any other appropriate type of user interface.

In this example, the application developer 342 launches a web application on a cloud application platform 320 and a third-party database management system on a container orchestration platform 330. The application developer 342 can provide the system controller 340 a cloud-based web application created by the application developer 342. The web application can make use of the third-party database management system. For example, the web application can be an online message board for a community of online users. The web application can use the database management system to store message board posts, user profiles, and other data for the message board.

The application developer 342 can submit, to the system controller 340, a request to deploy the web application on the cloud application platform 320. For example, the application developer 342 can use a CLI or GUI of a user device to submit the request to the system controller 340.

In response to this request, the system controller 340 can issue a deploy web application command 321 to the cloud application platform 320. As part of this process, the system controller 340 can use the deployment manager to provision resources for deploying one or more instances of the web application in the cloud application platform 320.

The system controller 340 can also deploy a registration agent command 322 to the cloud application platform 320. In response, the cloud application platform 320 can initiate an indicator registration agent in each virtual machine that hosts an instance of the web application. Each indicator registration agent can search 323 for an indicator file for the web application, e.g., on a file system of the system controller 340. If the indicator registration agent finds an indicator file for the web application, the registration agent can register the indicator file with an indicator registry. This allows a monitoring service to obtain values of indicators generated by the web application and generate user interfaces that present the values, e.g., without any further commands or information from the application developer 342.

The application developer 342 can next issue a command to launch the database management system on the container orchestration platform 330. As described above, container orchestration platforms may have certain advantages over cloud application platforms. As one example, container orchestration platforms tend to perform better for software tasks that maintain state and should be kept alive, e.g., a database. On the other hand, cloud application platforms tend to excel at software tasks that do not maintain state, e.g., web applications that service incoming HTTP requests.

In response, the system controller 340 can issue a create cluster command 331 that directs the container orchestration platform 330 to provision resources for a container cluster having a master node that coordinates multiple worker nodes that each maintain an instance of the database management system.

The application developer 342 can also issue a command to bind the web application on the cloud application platform 320 to the container cluster launched on the container orchestration platform 330. In response, the system controller 340 can provide binding information 332 to the launched container cluster that allows the nodes of the container cluster to locate and communicate with the instances of the web application.

The system controller 340 can also issue deploy a registration agent command 333 to the container orchestration platform 330. In response, the container orchestration platform 330 can initiate an indicator registration agent in each container cluster that hosts an instance of the database management service. Each indicator registration agent can search 334 for an indicator file for the database management system, e.g., on a file system of the system controller 340. If the indicator registration agent finds an indicator file for the database management system, the registration agent can register the indicator file with the indicator registry.

This allows a monitoring service to obtain values of indicators generated by the database management system and generate user interfaces that present the values, e.g., without any further commands or information from the application developer 342. For example, the database management system can generate various metrics related to providing the database service for the web application. These metrics can be presented in the user interfaces generated by the monitoring service.

The indicator file for the web application and the indicator file for the database management system can use the same platform-independent protocol for defining indicators, thresholds, user interface sections, and other data. For example, both indicator files can use the same protocol as the indicator document 200 illustrated in FIG. 2. In this way, the same indicator file for the database management system can be used regardless of whether the database management system is deployed on the cloud application platform 320 or the container orchestration platform 330.

Figure 4:
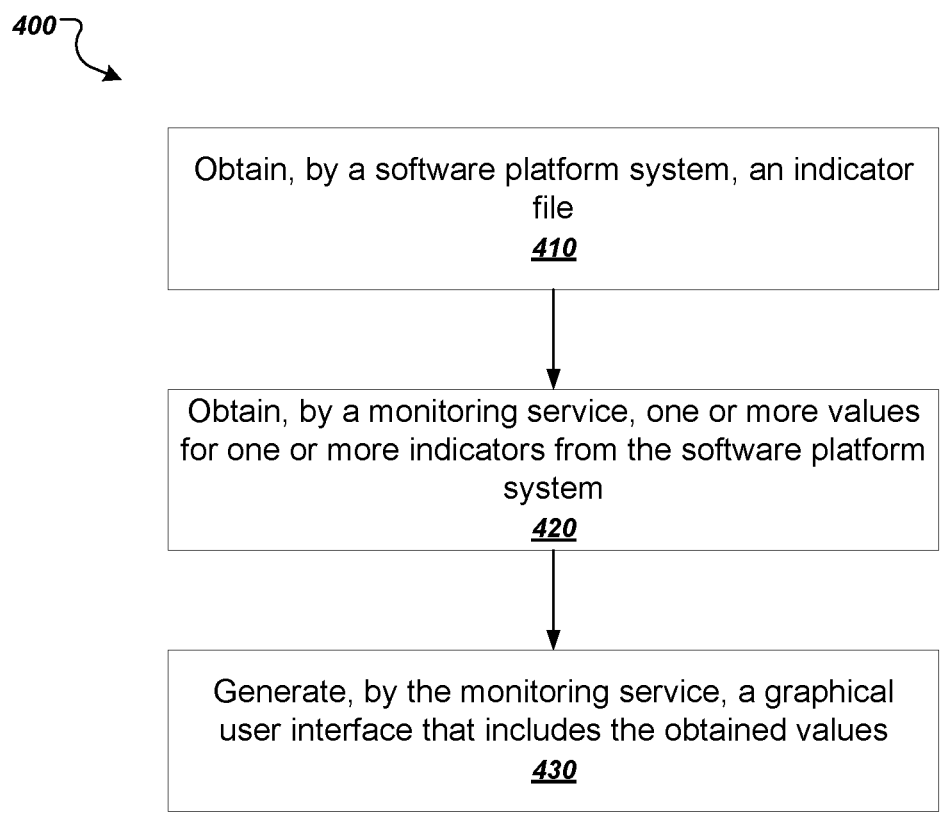
FIG. 4 is a flowchart of an example process for generating a user interface based on an indicator file.

FIG. 4 is a flowchart of an example process 400 for generating a user interface based on an indicator file. For convenience, the process 400 will be described as being performed by a distributed system having a plurality of computers in an underlying cloud computing system and programmed appropriately in accordance with this specification. For example, the cloud system 100 of FIG. 1, appropriately programmed can perform the example process.

A software application platform of the system obtains an indicator file (410). The software platform system can be configured to host computing tasks in a cloud computing environment of the distributed computing system. For example, the software platform system can be a cloud application platform or a container orchestration platform. The computing tasks can be user-provided packaged computing tasks, e.g., a web application, or a service that is consumed by the user-provided packaged computing tasks.

The software application can search for an indicator file for a particular computing task, e.g., in response to launching the particular computing task in the software application platform. In a particular example, a deployment manager can launch an indicator registration agent in each virtual machine or container cluster of the software application platform. The indicator registration agent can search a file system or other data storage location for the indicator file that corresponds to the particular computing task. If the indicator registration agent finds an indicator file for the computing task, the indicator registration agent can register the indicator file with an indicator registry.

As described above, the indicator file can be an indicator file that specifies one or more indicators that are monitored or determined by the computing task. Each indicator can be a measurable parameter for the computing task. The indicator file can also specify one or more alert thresholds for at least one indicator. The alert thresholds can be used to generate notifications to platform operators or other users.

A monitoring service of the system obtains one or more values for each of the one or more of the indicators from the software platform system (420). The monitoring service can use the indicator file to obtain the value(s). For example, the monitoring service can access the indicator registry to identify indicator files for active computing tasks running on the software platform system. The indicator file can include data that the monitoring service can use to query a data logger or the software platform for the values of the indicator(s). For example, as described above, the indicator file can include a query expression for each indicator that the monitoring service can use to generate queries to the data logger.

The monitoring service of the system generates a graphical user interface that includes, for each of the one or more indicators for which value(s) were obtained, data specifying the one or more values (430). The monitoring service can use the indicator file to generate the user interface. For example, the monitoring service can identify each indicator in the indicator file and generate a visualization in the user interface for each identified indicator. In another example, the indicator file can include, in a particular area of the indicator file, a list of indicators for which a visualization is to be created in the user interface. The visualization for an indicator can include a graph, table, raw numbers, or another representation of the value(s) for the indicator.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
  obtaining, by a software platform system configured to host computing tasks in a cloud computing environment of the distributed computing system, a user-customizable indicator file that specifies a set of indicators and, for at least one of the indicators, one or more alert thresholds, each indicator being a measurable parameter for a particular computing task hosted by the software platform system;
  obtaining, by a monitoring service and using the user-customizable indicator file, one or more values for each of one or more of the indicators from the software platform system; and
  generating, by the monitoring service and using the user-customizable indicator file, a graphical user interface that includes, for each of the one or more indicators, data specifying the one or more values for the indicator.

Embodiment 2 is the method of embodiment 1, further comprising:
  obtaining, by a second software platform system configured to host user-provided tasks in the cloud computing environment, the user-customizable indicator file;
  obtaining, by the monitoring service and using the user-customizable indicator file, one or more values for at least one of the indicators from the second software platform system; and
  generating, by the monitoring service and using the user-customizable indicator file, a second graphical user interface that includes, for the at least one indicator, data specifying the one or more values for the at least one indicator.

Embodiment 3 is the method of embodiment 2, further comprising:
  determining, by the monitoring service, that the alert threshold for a given indicator is satisfied based on the one or values obtained for the given indicator; and
  generating, by the monitoring service, an alert in response to determining that the alert threshold for a given indicator is satisfied.

Embodiment 4 is the method of any one of embodiments 1-3, wherein the particular user task is a software application developed by a software developer, the method further comprising receiving the user-customizable indicator file from the software developer.

Embodiment 5 is the method of embodiment 4, wherein the user-customizable indicator file is specific to a particular version of the software application.

Embodiment 6 is the method of embodiment 5, further comprising:
  updating, by the software platform system, the particular user task to an updated version of the software application;
  obtaining, by the software platform system, a second user-customizable indicator file specific to the updated version of the software application; and
  indicator file, a second graphical user interface that includes, for one or more second indicators specified by the second user-customizable indicator file, data specifying one or more values for the second indicator.

Embodiment 7 is the method of any one of embodiments 1-6, further comprising:
  searching, by the software platform system, one or more storage locations for indicator files;
  in response to finding the user-customizable indicator file in the one or more storage locations:
    registering the user-customizable indicator file with an indicator file registry; and
    performing tests to determine the one or more values for each of one or more of the indicators.

Embodiment 8 is the method of embodiment 7, wherein obtaining, by the monitoring service and using the user-customizable indicator file, the one or more values for each of the one or more of the indicators from the software platform system comprises identifying, in the indicator file registry, the user-customizable indicator file and obtaining the one or more values in response to identifying the user-customizable indicator file in the indicator file registry.

Embodiment 9 is the method of any one of embodiments 1-8, wherein the user-customizable indicator file is a platform-independent indicator file that is configured for use with different software platform systems.

Embodiment 10 is the method of any one of embodiments 1-9, wherein the indicator file included data specifying that one or more of the indicators are service level indicators (SLIs), the method further comprising:
identifying, in the indicator file, a target percentage of time that a given SLI is to satisfy a threshold for the SLI;
determining, based on the target percentage of time and a duration of time for which the SLI did not satisfy the threshold for the SLI, an error budget for the SLI; and
whenever the error budget exceeds an error threshold, determining to not send a notification although a current value of the SLI does not satisfy the threshold for the SLI.

Embodiment 11 is a system comprising: a plurality of computers and one or more storage devices storing instructions that are operable, when executed by the one or more computers, to cause the one or more computers to perform the method of any one of embodiments 1-10.

Embodiment 12 is a computer storage medium encoded with a computer program, the program comprising instructions that are operable, when executed by a plurality of computers, to cause the plurality of computers to perform the method of any one of embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by a distributed computing system comprising a plurality of computers, the method comprising:
obtaining, by a first software platform system configured to host computing tasks in a cloud computing environment of the distributed computing system, a service-specific indicator file that specifies a set of indicators to be monitored when a service hosted on the software platform is used by computing tasks hosted by the software platform, wherein the indicator file further specifies, for at least one of the indicators, one or more alert thresholds, each indicator being a measurable parameter for a particular computing task hosted by the software platform system;
obtaining, by a monitoring service and using the indicator file obtained by the software platform system, one or more values for each of one or more of the indicators for the service, wherein the monitoring service uses information in the indicator file to generate and execute data structure queries to obtain the one or more values;
generating, by the monitoring service and using the indicator file, a graphical user interface that includes, for each of the one or more indicators, data specifying the one or more values for the indicator;
determining, by the monitoring service, that the alert threshold specified in the indicator file for the particular version of the service for a given indicator is satisfied based on the one or more values obtained for the given indicator using the indicator file; and
generating, by the monitoring service, an alert in response to determining that the alert threshold for a given indicator is satisfied.

2. The method of claim 1, further comprising:
obtaining, by a second different software platform system configured to host user-provided tasks in the cloud computing environment, the indicator file, wherein the second software platform system is configured to execute a different type of software tasks than the first software platform system;
obtaining, by the monitoring service and using the indicator file, one or more values for at least one of the indicators for the service from the second different software platform system; and
generating, by the monitoring service and using the indicator file, a second graphical user interface that includes, for the at least one indicator, data specifying the one or more values for the at least one indicator.

3. The method of claim 1, wherein the particular user task is a software application developed by a software developer, the method further comprising receiving the indicator file from the software developer.

4. The method of claim 1, further comprising: updating, by the software platform system, the particular user task to an updated version of the; obtaining, by the software platform system, a second indicator file specific to the updated version of the; and generating, by the monitoring service and using the second indicator file, a second graphical user interface that includes, for one or more second indicators specified by the second indicator file, data specifying one or more, value for the second indicator.

5. The method of claim 1, further comprising:
searching, by the software platform system, one or more storage locations for indicator files;
in response to finding the indicator file in the one or more storage locations:
registering the indicator file with an indicator file registry; and
performing tests to determine the one or more values for each of one or more of the indicators.

6. The method of claim 5, wherein obtaining, by the monitoring service and using the indicator file, the one or more values for each of the one or more of the indicators from the software platform system comprises identifying, in the indicator file registry, the indicator file and obtaining the one or more values in response to identifying the indicator file in the indicator file registry.

7. The method of claim 5, wherein the searching comprises deploying an indicator registration agent in each virtual machine or container deployed in the software platform system and searching for the indicator file when a computing task of the hosted computing tasks is initiated.

8. The method of claim 1, wherein the indicator file is a platform-independent indicator file that is configured for use with different software platform systems.

9. The method of claim 1, wherein the indicator file includes data specifying that one or more of the indicators are service level indicators (SLIs), the method further comprising:
identifying, in the indicator file, a target percentage of time that a given SLI is to satisfy a threshold for the SLI;
determining, based on the target percentage of time and a duration of time for which the SLI did not satisfy the threshold for the SLI, an error budget for the SLI; and
whenever the error budget exceeds an error threshold, determining to not send a notification although a current value of the SLI does not satisfy the threshold for the SLI.

10. A distributed computing system comprising a plurality of computers and one or more storage devices storing instructions that are operable, when executed by the plurality of computers, to cause the plurality of computers to perform operations comprising:
obtaining, by a first software platform system configured to host computing tasks in a cloud computing environment of the distributed computing system, a service-specific indicator file that specifies a set of indicators monitored when a service hosted on the software platform system is used by computing tasks hosted by the software platform, wherein the indicator file further specifies, for at least one of the indicators, one or more alert thresholds, each indicator being a measurable parameter for a particular computing task hosted by the software platform system;
obtaining, by a monitoring service and using the indicator file obtained by the software platform system, one or more values for each of one or more of the indicators for the service, wherein the monitoring service uses information in the indicator file to generate and execute data structure queries to obtain the one or more values;
generating, by the monitoring service and using the indicator file, a graphical user interface that includes, for each of the one or more indicators, data specifying the one or more values for the indicator;
determining, by the monitoring service, that the alert threshold specified in the indicator file for the particular version of the service for a given indicator is satisfied based on the one or more values obtained for the given indicator using the indicator file; and
generating, by the monitoring service, an alert in response to determining that the alert threshold for a given indicator is satisfied.

11. The system of claim 10, wherein the operations comprise:
obtaining, by a second different software platform system configured to host user-provided tasks in the cloud computing environment, the indicator file, wherein the second software platform system is configured to execute different type of software tasks than the first software platform system;
obtaining, by the monitoring service and using the indicator file, one or more values for at least one of the indicators for the service from the second different software platform system; and
generating, by the monitoring service and using the indicator file, a second graphical user interface that includes, for the at least one indicator, data specifying the one or more values for the at least one indicator.

12. The system of claim 10, wherein the particular user task is a software application developed by a software developer, the method further comprising receiving the indicator file from the software developer.

13. The system of claim 10, wherein the operations comprise: updating, by the software platform system, the particular user task to an updated version of the; obtaining, by the software platform system, a second indicator file specific to the updated version of the; and generating, by the monitoring service and using the second indicator file, a second graphical user interface that includes, for one or more second indicators specified by the second indicator file, data specifying one or more values for the second indicator.

14. The system of claim 10, wherein the operations comprise:
searching, by the software platform system, one or more storage locations for indicator files;
in response to finding the indicator file in the one or more storage locations:
registering the indicator file with an indicator file registry; and
performing tests to determine the one or more values for each of one or more of the indicators.

15. The system of claim 14, wherein obtaining, by the monitoring service and using the indicator file, the one or more values for each of the one or more of the indicators from the software platform system comprises identifying, in the indicator file registry, the indicator file and obtaining the one or more values in response to identifying the indicator file in the indicator file registry.

16. The system of claim 14, wherein the searching comprises deploying an indicator registration agent in each virtual machine or container deployed in the software platform system and searching for the indicator file when a computing task of the hosted computing tasks is initiated.

17. The system of claim 10, wherein the file is a platform-independent indicator file that is configured for use with different software platform systems.

18. One or more non-transitory computer storage media encoded with computer program instructions that when executed by a distributed system comprising a plurality of computers cause the plurality of computers to perform operations comprising:
- obtaining, by a first software platform system configured to host computing tasks in a cloud computing environment of the distributed computing system, a service-specific indicator file that specifies a set of indicators to be monitored when a service hosted on the software platform system is sued by computing tasks hosted by the software platform, wherein the indicator file further specifies, for at least one of the indicators, one or more alert thresholds, each indicator being a measurable parameter for a particular computing task hosted by the software platform system;
- obtaining, by a monitoring service and using the indicator file obtained by the software platform system, one or more values for each of one or more of the indicators for the service, wherein the monitoring service uses information in the indicator file to generate and execute data structure queries to obtain the one or more values;
- generating, by the monitoring service and using the indicator file, a graphical user interface that includes, for each of the one or more indicators, data specifying the one or more values for the indicator;
- determining, by the monitoring service, that the alert threshold specified in the indicator file for the particular version of the service for a given indicator is satisfied based on the one or more values obtained for the given indicator using the indicator file; and
- generating, by the monitoring service, an alert in response to determining that the alert threshold for a given indicator is satisfied.

\* \* \* \* \*